Feb. 23, 1954     E. F. STACEY     2,669,734
MACHINE FOR ASSEMBLING SHOE BOTTOM PARTS
Filed May 26, 1951     3 Sheets-Sheet 1

Inventor
Ernest F. Stacey
By his Attorney

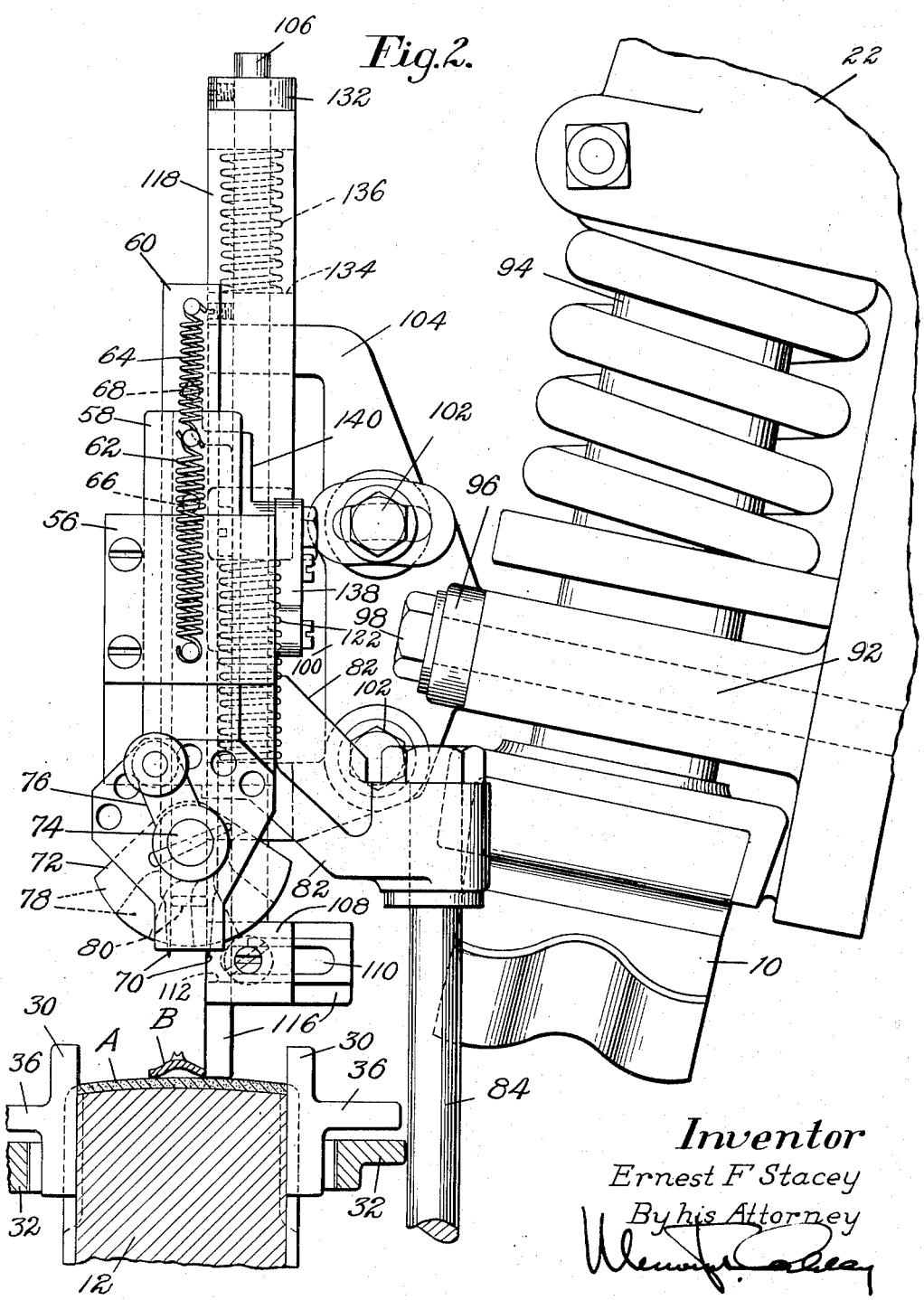

Feb. 23, 1954   E. F. STACEY   2,669,734
MACHINE FOR ASSEMBLING SHOE BOTTOM PARTS
Filed May 26, 1951   3 Sheets-Sheet 3
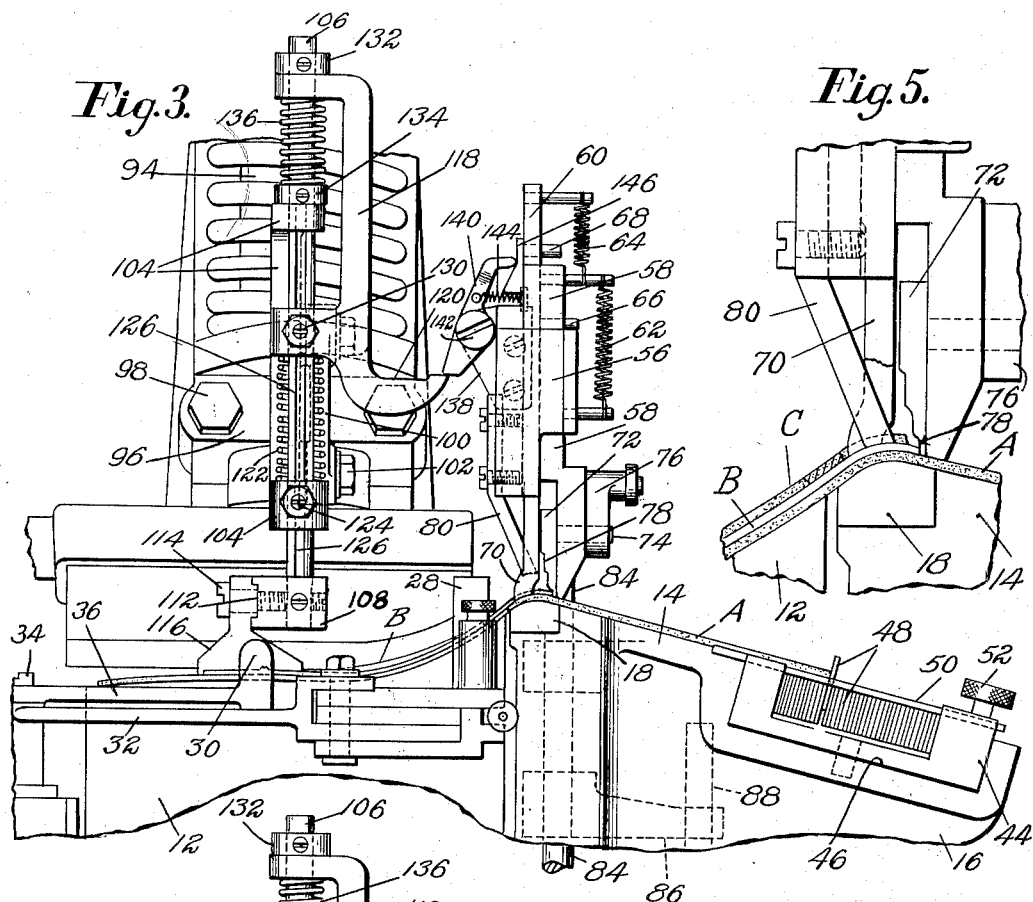
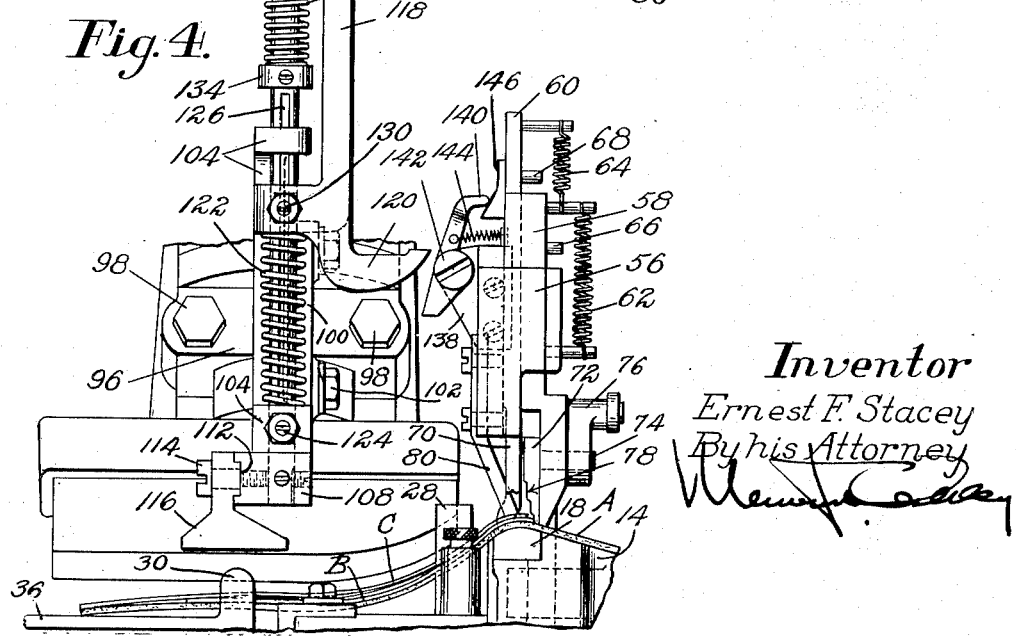
Inventor
Ernest F. Stacey
By his Attorney Patented Feb. 23, 1954

2,669,734

UNITED STATES PATENT OFFICE 2,669,734

MACHINE FOR ASSEMBLING SHOE BOTTOM PARTS

Ernest F. Stacey, Beverly, Mass., assignor to United Shoe Machinery Corporation, Flemington, N. J., a corporation of New Jersey Application May 26, 1951, Serial No. 228,381

20 Claims. (Cl. 12—18.5)

This invention relates to machines for use in assembling and molding shoe bottom parts to form integral shoe bottom units and is illustrated herein by way of example as embodied in a machine of the general type illustrated in United States Letters Patent No. 2,083,583, granted June 15, 1937, on an application filed in the name of John M. Whelton.

In machines of the type referred to, a plurality of shoe bottom parts, including an insole, a premolded shank stiffener and a reinforcing member or shank and heel piece, are assembled together and compressed or molded into an integral shoe bottom unit, the parts being previously coated with cement to cause them to adhere to each other. Machines of this type are provided with a work support or lower mold and an upper mold or pressing member, and they are also provided with means for relatively positioning the shoe bottom parts on the lower mold or support. Heretofore in machine of this character, the insole has been positioned on the support by gaging means in the form of fingers which engage the shank and heel portions of the insole and position it laterally or widthwise of the support, and also by a single gage or abutment at the forepart of the support against which the toe end of the insole is placed to position it lengthwise of the support. The preformed shank-stiffener has been positioned on the support relatively to the insole by a forked gage arranged to straddle the front end of the shank stiffener and position it widthwise of the support, and also by an adjustable gage or plate which provides an abutment against which the forward end of the stiffener may be moved to position the latter lengthwise of the support.

Although the shank stiffener has always been positioned accurately lengthwise of the support, and its forward end has also been positioned accurately widthwise of the support, the gage for performing this latter function has also been relied upon to position the rearward end of the shank stiffener widthwise of the support, this gage having parallel confronting surfaces thereon which engage substantial lengths of the opposite edge faces of the stiffener and thereby control to a limited extent the angle of the shank stiffener laterally of the support. While this construction has sufficed in the past to locate the rear or heel end of the shank stiffener is a position widthwise of the support which is usually accurate enough to produce satisfactory results, it nevertheless is not sufficiently accurate to cause every unit produced by the machine to be exactly the same with respect to the position of the rear end of the shank stiffener relatively to the other shoe bottom parts. In other words, slight variations or differences in the widthwise position of the rear end of the shank stiffener would obviously result from this procedure because the operator was obliged to centralize or position the rear end of the shank stiffener partly by skill or judgment. Consequently, while no great discrepencies in the position of the rear end of the shank stiffeners would be likely to occur, because of the parallel surfaces referred to on the forward gage, nevertheless it was possible for the operator to locate the rear ends of successive shank stiffeners in slightly different positions widthwise of the support or the insoles resting thereon. Moreover, since no means was provided for holding the rear or heel end of the shank stiffener in a predetermined widthwise position on the support until after the parts had been clamped or pressed together against the support, it was also possible for the rear end of the shank stiffener to shift laterally of the support after it had been positioned thereon by the operator, thereby making it necessary for the operator to stop the operation of the machine and relocate the rear end of the stiffener on the support. If the displacement of the shank stiffener should happen to escape the attention of the operator, the resulting shoe bottom unit would be imperfect or defective with respect to the location of the shank stiffener relatively to the other shoe parts. Although a slight lateral variation in the widthwise position of the rear end of the shank stiffener would probably not be serious enough to damage the shoe in which the unit was to be used, a larger displacement or variation might be sufficient in some cases to cause the heel attaching screw to strike the rear end of the shank stiffener and be deflected from its normal path into the heel, thereby weakening the attachment of the heel to the shoe as well as damaging the shank stiffener. Since such a displacement would not ordinarily become known until the heel was being attached to the shoe, it will be seen that even relatively small variations in the widthwise position of the rear end of the shank stiffener in a completed shoe bottom unit might, in some instances, prove extremely costly.

An important object of the present invention is to overcome the difficulties pointed out above by insuring that the rear or heel end of the shank stiffener in a unit of this kind will be accurately located in every instance relatively to the work support or the insole thereon so that every unit assembled on the machine will be exactly the same. A further object of the invention is to provide improved means for accomplishing this result which will not interfere with the subsequent operation of the machine in producing the shoe bottom unit in the usual or normal manner.

thereby permitting shoe bottom units to be produced as fast as they have been heretofore in such machines but more accurately and with less work or responsibility on the part of the operator, particularly with respect to insuring that the rear ends of the shank stiffeners are properly located on the support at the start of the molding operation, and also to insuring that the parts do not inadvertently shift position widthwise of the support before the parts have been compressed or molded into an integral shoe bottom member.

To the accomplishment of these objects, the invention provides, in accordance with one feature, improved means in a machine of the type under consideration for positively determining or gaging the position of the rear or heel end of the shank stiffener widthwise of the support and relatively to the rear or heel ends of the insole and the reinforcing member which combine with the shank stiffener to form the complete shoe bottom unit. As herein illustrated, the means for positively determining the position of the rear end of the shank stiffener comprises a gage member, movable toward and away from the support and arranged to engage the rear or heel seat portion of the insole after the latter has been positioned on the support, said gage member being constructed and arranged to serve as a stop or abutment for positively locating the rear end portion of the shank stiffener widthwise of the support.

In accordance with another feature of the invention, the positioning means or gage for locating the rear end of the shank stiffener widthwise of the support is arranged to be moved into operative position relatively to the support together with the means provided in the machine for positioning the forward end of the shank stiffener widthwise of the support, thereby insuring that both positioning means will be located in an operative position relatively to the support at substantially the same time and before the shank stiffener is to be positioned on the support.

In accordance with still another feature of the present invention, the improved means for positioning the rear end of the shank stiffener widthwise of the support is further arranged to be removed from operative position relatively to the support automatically before the molding operation is begun but while the mechanisms for positioning the forward end of the shank stiffener widthwise and lengthwise of the support are still located in operative position, thereby permitting the molding operation to take place at the shank and heel portions of the insole and other shoe bottom parts without interference from the present means which now positions the rear end of the shank stiffener positively on the support. As herein illustrated, the means in the present construction for automatically removing the rear end positioning means or gage from the vicinity of the work support after the gage has served its purpose comprises spring means operating independently upon said gage together with a hook and latch arrangement which is actuated automatically during the operation of the machine to permit said spring means to return the rear positioning means or gage to an elevated position before the molding operation takes place but not until after the shoe bottom parts have been pressed initially against the support to insure that the shank stiffener will not inadvertently shift position widthwise of the support after the rear gage has been removed but before the upper mold of the machine has been brought into operative position relatively to the shoe bottom parts.

With the above and other objects and features in view, the invention will now be described in detail in connection with the accompanying drawings and will thereafter be pointed out in the claims.

In the drawings,

Fig. 2 is an enlarged side elevation of the assembling and molding instrumentalities of the machine with parts shown in section, the mechanism being shown partially operated;

Fig. 3 is a front elevation of the work support and positioning means with the latter located in operative relation to shoe bottom parts mounted on the support;

Fig. 4 is a view similar to Fig. 3 after the work positioning means has performed its function and a part of this mechanism has been withdrawn from operative position; and Fig. 5 is an enlarged detail view of the positioning means at the forward end of the shoe bottom parts in the fully operated position illustrated in Fig. 4.

Figure 1:
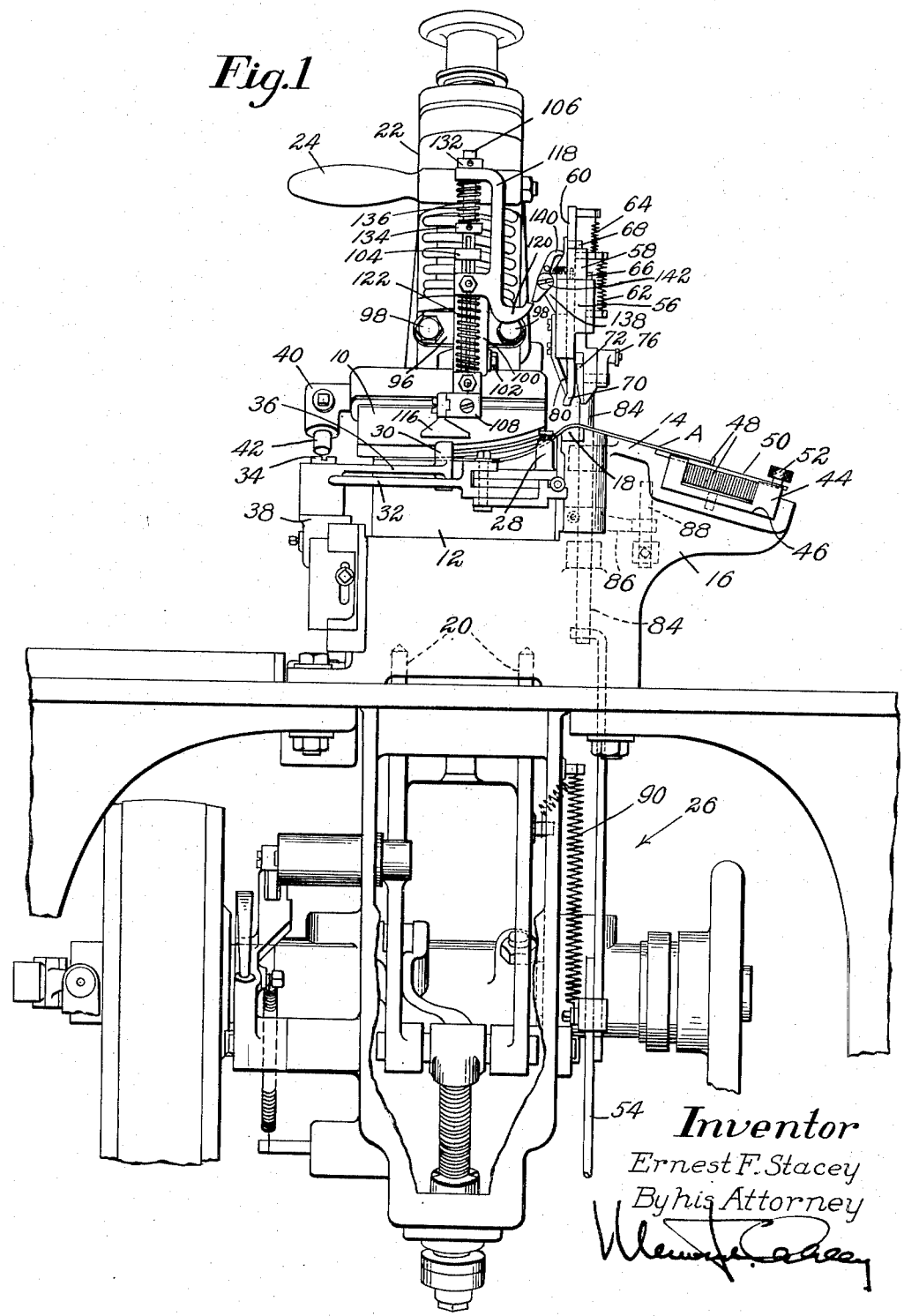
Fig. 1 is a front elevation of a machine for assembling and molding shoe bottom parts embodying the present invention.

The illustrated machine for assembling and molding shoe bottom parts to form a shoe bottom or insole unit is substantially the same in its general organization as the machine illustrated in the Whelton patent referred to above. As disclosed in that patent, the machine is provided with mold members 10 and 12 which operate to press together shoe bottom parts previously coated with cement, the parts comprising an insole of usual construction, a premolded shank stiffener of metal and a reinforcing member or shank and heel piece usually composed of moldable material such as fiber, this latter member reinforcing the shank and heel seat portions of the shoe bottom unit and being cut to a shape and size which conforms accurately to the insole to which it is to be attached.

The mold 12 forms a part of the means for supporting the shoe bottom parts while they are being molded into an integral unit, the section 12 of the support preferably comprising a wooden block having an upper surface shaped to conform the heel and shank portions of the unit into the desired configuration. The support for the shoe bottom parts also includes a relatively flat forepart section 14 formed by a cast-iron frame 16 which slants downwardly from left to right, as viewed in Figs. 1 and 3, and has an interchangeable steel block 18 embedded therein for supporting the sole in the region of the ball line. The frame member 16 is located on the base of the machine by dowels 20 as shown in Fig. 1. The upper mold or presser member 10 is carried by an over-hanging arm 22 mounted for swinging movement forwardly and rearwardly of the support and provided with a handle 24 whereby it may be swung forwardly by an operator to bring the mold 10 into vertical alinement with the mold or block 12 of the support. As disclosed in the patent referred to, such movement of the arm 22 actuates power-operated mechanism, indicated generally in Fig. 1 by the reference numeral 26, for moving the mold 10 downwardly and thereby causing it to press the shoe bottom parts together to mold them to the shape of the lower mold or block 12.

The insole is positioned on the support 12, 14 by two pairs of positioning gages or fingers 28 and 30 which are arranged to centralize the insole on the support, the fingers 28 extending vertically from the free ends of arms 32 pivotally mounted on screws 34 and geared together for equal and opposite movement, these fingers being arranged to engage the opposite edge faces of the insole, and also the reinforcing piece subsequently assembled thereon, at substantially the narrowest point of the shank portions of those two members. The fingers 30 are mounted on arms 36 which are also pivoted on the screws 34 and are shorter than the arms 32 so that the fingers will engage the opposite edge faces of the insole and reinforcing member at substantially the widest part of the heel portions thereof, the arms 36 being likewise interconnected by gear segments for equal and opposite movement toward and away from the work pieces to centralize them relatively to the support. As disclosed in the patent referred to, this assemblage of positioning fingers is mounted on a vertically movable carriage or slide 38 (Fig. 1) which is depressed automatically against a spring (not shown) when the upper mold or presser 10 is brought into operation, thereby moving the positioning fingers 28 and 30 to a lower level so that they will not interfere with the downward movement of the presser 10 when the shoe bottom parts are being molded against the member 12 of the support. In order to depress the fingers 28, 30, the arm 22 is provided with a laterally extending boss 40 (Fig. 1) which has a plug 42 secured therein which is located in a position to register with one of the screws 34 when the presser 10 is moved forwardly over the support 12, 14. When the presser descends, as will be later explained, the plug 42 engages the screw 34 and depresses the slide 38 and the fingers 28 and 30 so that the presser does not touch the fingers.

The insole is located lengthwise of the support 12, 14 by positioning means carried by the forepart section 14 of the support, this means comprising a rectangular holder 44 mounted in a cavity 46 formed in the casting or frame member 16. A plurality of gaging plates or abutments 48 of uniform thickness are stacked in face-to-face contact with each other in the holder 44 and two parallel rods or pins (not shown) extend through these plates, the rods passing through two inclined slots (not shown) constituting cams which elevate or lower the plates in consequence of shifting them endwise in the holder. When any one plate is raised by this endwise movement, it provides an abutment against which the toe end of an insole may be placed to position the insole lengthwise of the support 12, 14. A scale 50 is provided for indicating the sizes or lengths of the insoles and is held in place by a thumb screw and spring clip 52. An insole, for example, the insole A illustrated in the drawings, is thus located widthwise or laterally of the support 12, 14, by the two pairs of fingers 28 and 30, and it is located lengthwise of the support by the appropriate gage-plate 48.

When the insole A has been located in the desired position on the support 12, 14 by the appropriate gage-plate 48 and the two pairs of fingers 28 and 30, the operator depresses a treadle (not shown) which, through a treadle rod 54 (Fig. 1), lowers an assemblage of relatively movable members in a fixed vertical path against the upper surface of the insole in the vicinity of the ball-line, thereby pressing the insole against the support, particularly the block 18, with sufficient pressure to bend the sole into conformity with the curvature of the block 18. This operation serves to hold the insole temporarily in position on the support and prevents the toe end of the insole from rising out of engagement with the gage-plate 48 or the heel seat portion from springing out of engagement with the positioning fingers 28 and 30.

The assemblage depressed by the treadle rod 54, as disclosed in the patent referred to, comprises a vertically movable block or head 56, a relatively movable slide bar 58 mortised therein, and another relatively movable slide bar 60 mortised into the bar 58. The slide bar 58 is normally depressed relatively to the head 56 by a spring 62 while the slide bar 60 is normally depressed relatively to the bar 58 by a spring 64. A stop-pin 66 carried by the bar 58 is arranged to engage the upper surface of the head 56 to limit downward sliding movement of the bar 58 while a similar stop-pin 68 carried by the slide bar 60 is arranged to engage the upper end of the bar 58 to limit relative downward movement of the bar 60.

The lower end of the slide bar 60 is forked to provide two fingers 70 having confronting parallel surfaces spaced apart a distance equal to the width of the forward end of a steel shank-stiffener, such as that indicated by the letter B in the drawings. These parallel fingers 70 operate to locate the forward end of the shank-stiffener widthwise of the support 12, 14 and they also operate, when brought down upon the insole, to press the latter against the block 18 of the support and thereby assist in bending the sole over this portion of the support.

The lower end of the vertically movable slide bar 58 carries a gage 72 for locating the forward end of the shank-stiffener B lengthwise of the support 12, 14 and in register with the curvature of the block 18 of the support. The gage 72 is secured to a horizontal pin 74 rotatably mounted in the slide bar 58 and provided with a handle 76 by which it may be turned in the slide bar. The gage 72 has a series of flat surfaces or lands 78 thereon arranged in stepped relation to each other so that, by turning the handle 76, one of these flat surfaces 78 may be brought into operative position in register with the parallel fingers 70 which are arranged to straddle the forward end of the shank-stiffener to position it widthwise of the support, the gage 72, as stated, locating the shank-stiffener lengthwise of the support. In positioning the forward end of the shank-stiffener on the support, the operator inserts said forward end between the parallel fingers 70 and moves the stiffener toward the toe-end of the insole until it abuts against whichever one of the surfaces 78 of the gage 72 is then in operative position. In this way the steel shank-stiffener B is positioned lengthwise of the support 12, 14 and of the insole A, and its forward end is located widthwise of the support and insole. Since the construction and operation of the gage 72 is fully disclosed in the Whelton patent above referred to, a further description thereof need not be given herein.

As illustrated in Figs. 1, 3 and 5, a finger 80 is rigidly secured by screws to the movable head or block 56 and the lower end of this finger is located between the parallel fingers 70 which position the forward end of the shank-stiffener widthwise of the support. The function of the finger 80 is to press the forward end of the shank-stiffener against the insole in pursuance of final depression of the treadle and treadle rod 54, as will be explained more fully hereinafter.

As described in the patent referred to, the block or head 56 is provided with a rearwardly extending arm 82 (Fig. 2) which is secured to the upper end of a vertical shaft 84 slidable in bearings in the frame 16 and connected at its lower end to the treadle rod 54 (Fig. 1), the shaft being held against rotation in the frame by an arm 86 fastened to the shaft and engaging a fixed vertical guide-pin 88. The shaft 84 is maintained normally in its elevated position by a tension spring 90 extending between the frame and the treadle rod 54, thereby holding the block 56 in its highest position which is a sufficient distance above the support 12, 14 to avoid obstructing the positioning of the insole on the support.

In the operation of the mechanism thus far described, the operator, after locating the insole A on the support 12, 14 in the manner described above, depresses the treadle to lower the treadle rod 54 and move the shaft 84 downwardly, thereby moving the block 56 and mechanism carried thereby downwardly toward the insole. The parallel fingers 70 on the slide bar 60 will be the first element of the vertically movable assemblage to engage the upper surface of the insole. The spring 64 will yield to permit the slide bar 58 to continue its downward movement until its lower extremity also engages the insole and is arrested thereby, the spring 62 now being effective to maintain the pressure of the bar 58 against the insole, the bar 58 being offset, as illustrated in Figs. 3 and 4, to provide space for the gage 72. The lower edge of the gage 72 and the lower end of the slide bar 58 are substantially flush and consequently these members bear against the upper surface of the insole A and have a bending and clamping effect thereon. The resistance of the springs 64 and 62 added to that of the tension spring 90 (Fig. 1) indicates to the operator that the insole is now firmly pressed against the support 12, 14 and is bent around the block 18 even though the block or head 56 will not, at this time, have been depressed to its lowest position. When the mechanism has assumed this position, the operator will interrupt the downward movement of the treadle and will superpose the shank-stiffener B upon the insole A and locate the forward end of the shank-stiffener on the support by inserting it between the parallel fingers 70 and moving it forwardly until it strikes against the gage 72. The forward end of the shank-stiffener having been thus located both widthwise and lengthwise relatively to the support 12, 14, and also relatively to the insole A, the operator depresses the treadle further to move the treadle rod 54 downwardly to its lowest position, thereby moving the block 56 into its lowest position and causing the rigid finger 80 to move downwardly, as shown in Figs. 4 and 5, to engage the forward end of the shank-stiffener B and press it firmly against the insole A, the springs 62 and 64 yielding to permit this further downward movement of the block 56 relatively to the slide bars 58 and 60.

It will be noted from the foregoing that, although the shank stiffener B has been positively located at its forward end lengthwise of the support by the gage 72, and although the stiffener has also been accurately positioned at its forward end widthwise of the support by the parallel fingers 70, it has not yet been positively positioned widthwise of the support at its rearward or opposite end. In the machine of the Whelton patent referred to, as stated above, the position of the rear or heel end of the shank stiffener widthwise of the support was determined in a general way by the extent of contact of the confronting parallel surfaces of the two fingers 70 with the longitudinal edges of the shank stiffener, this contact having been regarded as sufficient to position the rear end of the stiffener widthwise of the support.

The widthwise position of the rear end of the shank stiffener B on the support 12, 14 is determined or controlled in accordance with the present invention in the following manner. The overhanging arm 22 (Figs. 1 and 2), which carries the upper mold 10, has a boss 92 thereon which forms a lower bearing for a plunger 94 which operates the mold 10. The boss 92 has a plate 96 secured to its forward end by screws 98 and this plate is provided, at its central portion, with a forwardly extending vertical flange or rib 100. Adjustably secured to the rib 100 by screws 102 is a fixed bracket 104. The opposite ends of the vertical bracket 104 project forwardly, as illustrated in Fig. 2, to form arms having holes bored therein which are in vertical alinement with each other and which receive a rod 106 arranged for sliding movement heightwise of the bracket 104. Secured by set screws to the lower end of the sliding rod 106 is a block 108 having a groove or guideway 112 formed in its left-hand side wall, as viewed in Figs. 1 and 3. Adjustably mounted in the guideway 112 by a shoulder screw 114 is a gage 116 which, as illustrated in Figs. 2 and 3, projects downwardly from the block and is substantially triangular in shape, as viewed from the front of the machine, so that it has a relatively long lower portion opposite the work support 12, 14, the gage having formed therein a horizontal slot 110 to permit adjustment thereof transversely of the work support. The upper portion of the rod 106 has an elongated casting 118 slidably mounted thereon by means of laterally projecting arms at its opposite ends, the lower end of the casting being also provided with a laterally extending arm or hook 120. The casting 118 is normally supported in an elevated position on the rod 106 by a spring 122 interposed between the casting and the lower arm of the fixed bracket 104. The rod is prevented from turning in the bracket 104 by a screw 124 threaded into the lower arm of the bracket and extending into a vertical slot or keyway 126 in the rod. The casting 118 is prevented from turning on the rod 106 by a screw 130 threaded into the lower arm of the casting and also extending into the keyway 126. Consequently, the arm or hook 120 which, as viewed in Figs. 1 and 3, extends toward the right or parallel to the work support 12, 14, is maintained permanently in that position. The gage 116 is normally located in an elevated or inoperative position, as shown in Figs. 1 and 4, by the spring 122 which forces the casting 118 upwardly on the rod 106 until the upper arm of the casting engages a collar 132 pinned to the upper end of the rod, thereby holding the casting 118, the rod 106, and the gage 116 in their elevated positions. Substantially midway between the laterally extending arms of the casting 118, the rod 106 has a second collar 134 fastened thereto by a setscrew and, interposed between the collar 134 and the upper arm of the casting 118, is a spring 136. The spring 136 tends to urge the casting 118 upwardly relatively to the rod 106, thereby maintaining the casting normally in its upper position relatively to the rod. As illustrated in the drawings, the gage 116 is located slightly to the left of the center of the section 12 of the work support, thereby locating the lower edge portion of the gage substantially opposite the heel breast line of an insole mounted on the support. Since the gage is elongated lengthwise of the support, its lower edge portion will extend a substantial distance either side of the heel breast line of the insole.

The block 56 of the vertically movable assemblage has secured by screws to its inner side, as viewed in Figs. 1 and 3, a small triangular shaped bracket 138 which extends toward the left and has a latch or pawl 140 pivotally mounted thereon by means of a screw 142. A lower arm on the latch 140 is located in a position to engage the hook 120 on the casting 118 when the parts are located in an elevated or inoperative position, as shown in Fig. 1, the latch being urged in a clockwise direction about its pivot 142 by a spring 144. The upper arm of the latch 140 extends toward the right and engages a cam plate 146 secured in any suitable manner to the slide bar 60. As illustrated in Figs. 3 and 4, the cam plate 146 slants outwardly or toward the left from its upper to its lower end.

In assembling the shoe bottom parts in the machine, the operator first positions the insole A on the support 12, 14, as described above, and he then depresses the treadle to lower the treadle rod 54 and move the vertically movable assemblage carried by the block 56 downwardly. The latch 140, being in engagement at that time with the hook 120 on the slidable casting 118, causes the latter to move downwardly with the movable assemblage and, through the spring 136, causes the casting to lower the vertical rod 106 to move the gage 116 downwardly toward the section 12 of the work support, thereby bringing the gage into engagement with the insole A on the support, as shown in Figs. 2 and 3. The operator then stops depressing the treadle and introduces the forward end of the shank stiffener B between the parallel arms 70 on the sliding bar 60 and moves the stiffener toward the right into engagement with the gage 72, thereby locating the forward end of the shank stiffener both lengthwise and widthwise of the support. The gage 116 having been located in operative position relatively to the section 12 of the support simultaneously with the forward gages 70 and 72, the operator can now move the rearward end of the shank stiffener inwardly on the support until the inner edge of its rear or left-hand end portion engages the forward surface of the gage 116, thereby positively locating the rear or left-hand end of the shank stiffener widthwise of the support 12. Since the gage 116 is adjustable widthwise of the support, as illustrated in Fig. 2, by the tongue and groove arrangement 112 previously referred to, the gage can always be initially adjusted relatively to the support or the insole A so that the rear or heel end of the shank stiffener can be located in exactly the desired position widthwise of the support regardless of the size or shape of the rear end of the shank stiffener.

Having thus positively located the shank stiffener B both lengthwise and widthwise of the support 12, 14 and insole A, the operator is now ready to move the presser foot 80 downwardly into engagement with the shank stiffener and thereby press the stiffener and insole firmly against the support in the vicinity of the ball line of the insole or, as illustrated in Figs. 3 and 5, in the vicinity of the interchangeable block 18 which forms a part of the support. The operator depresses the treadle to move the treadle rod 54 downwardly to the lower limit of its downward movement, thereby moving the block 56 downwardly relatively to the slide bars 58 and 60 to bring the presser member 80 into engagement with the forward end of the shank stiffener B, as illustrated in Figs. 4 and 5. Downward movement of the block 56 moves the latch 140 downwardly relatively to the cam plate 146 so that the upper arm of the latch is forced outwardly or toward the left by the inclined surface of the cam plate, thereby disconnecting the latch from the hook 120 on the slidable casting 118. Release of the casting 118 permits the spring 122 to elevate the casting until its upper arm engages the collar 132 fixed to the rod 106, thereby moving the rod itself upwardly until the block 108 on the lower end of the rod engages the lower arm or boss on the fixed bracket 104, thereby returning the gage 116 into its upper or inoperative position, as illustrated in Fig. 4. Since the gage 116 has now been returned automatically to its elevated or inoperative position, the upper surface of the insole A is free of the obstruction caused by this gage and, accordingly, the reinforcing member or shank and heel piece referred to may be mounted upon the assembled insole and shank stiffener, the shank and heel piece being indicated in Figs. 4 and 5 by the letter C. As stated above, the shank and heel piece conforms in outline to the shank and heel portions of the insole A and, accordingly, it can be positioned on the insole in alinement with the periphery thereof by the positioning fingers 28 and 30, which are still located in operative position against the edge face of the insole to maintain it in its proper lateral position on the support. The shank and heel piece is located lengthwise of the insole, as described in the Whelton patent, by the operator placing one finger against the rear edge of the shank and heel piece and the rear edge of the insole. The forward end of the shank and heel piece C is cut away by a U-shaped slot, as illustrated in the patent referred to, so that the front end of the shank stiffener B may extend through this slot, this being the usual manner of assembling these three parts when forming a shoe bottom unit. The U-shaped slot in the forward end of the shank and heel piece C is of sufficient width to straddle the parallel fingers 70 of the slide bar 60, as illustrated in Fig. 5, the shank and heel piece usually terminating somewhat short of the gage 72 which locates the shank stiffener lengthwise of the support.

With the three shoe parts located in the manner just described, the operator swings the arm 22 forwardly by its handle 24 to move the upper mold 10 into vertical alinement with the section 12 of the work support. As disclosed in the patent referred to, such movement of the swinging arm 22 automatically starts the operation of the power-operated mechanism 26 of the machine by tripping a one-revolution clutch and thereby causing this mechanism to move the plunger 94 downwardly to bring the upper mold 10 against the assembled shoe bottom members now held by the presser 80 on the support 12, 14. As indicated above, downward movement of the plunger 94 and upper mold 10 causes the plug 42 (Fig. 1) to descend into engagement with one of the pivots 34 of the positioning fingers 28 and 30, thereby depressing these fingers so that they will not interfere with the molding operation performed by the upper mold 10.

After the machine has operated through one complete revolution or cycle, the clutch of the operating mechanism 26 is automatically thrown out of operation and the mold 10 is elevated to its initial position, after which the arm 22 is swung rearwardly into its inoperative position. Simultaneously with such movement, or earlier if desired, the operator releases the treadle to permit the treadle rod 54 to be elevated by the spring 90, thereby returning the vertically movable assemblage including the block 56 upwardly to the inoperative position shown in Fig. 1. This action causes the slide bars 58 and 60 to be returned automatically through their springs 62, 64 to their inoperative positions illustrated in Fig. 1 so that the latch 140 is raised again relatively to the slide bar 60 to move the upper arm of the latch upwardly beyond the inclined surface on the cam plate 146. Such action permits the latch 140 to snap over the hook 128 on the casting 118 and thereby be located in a position to engage said hook upon the next depression of the treadle and treadle rod 54. Accordingly, when the next set of shoe bottom parts is being assembled in the machine, the latch 140 will lower the gage 116 with the forward gages 70 and 72 in the manner already described and thereby permit the rear end of the shank stiffener to be positively located widthwise of the support at the same time that the forward end of the stiffener is located lengthwise and widthwise of the support.

Although the invention has been disclosed herein by way of example as embodied in a machine for assembling and molding shoe bottom parts to produce integral shoe bottom units, the invention is obviously not limited in its utility to machines of that particular type but is applicable more generally in its broader aspects to machines for performing operations other than assembling and molding operations.

Having thus described my invention what I claim as new and desire to secure by Letters Patent of the United States is:

1. A machine for use in assembling shoe bottom parts having, in combination, a support for said parts, means movable toward and away from the support for positioning one of said parts lengthwise of the support, means movable toward and away from the support with said movable means for positioning one end portion of said part widthwise of the other part, and means movable toward the support with both of said first-named positioning means for positioning the opposite end portion of said one part widthwise of the other part.

2. A machine for use in assembling shoe bottom parts having, in combination, a support for said parts, means for positioning said parts relatively to each other lengthwise of the support, and means movable toward and away from the support for engaging the opposite end portions of one of said parts and positioning them widthwise of the other part.

3. A machine for use in assembling shoe bottom parts having, in combination, a support for said parts, means movable toward and away from the support for positioning one of said parts lengthwise of the support, means movable with said positioning means for positioning one end of said part widthwise of the support, means movable toward the support with both of said first-named positioning means for positioning the other end of the said part widthwise of the support, and means for moving said last-named positioning means away from the support independently of the two first-named positioning means.

4. A machine for use in assembling shoe bottom parts having, in combination, a support for said parts, means movable toward and away from the support for positioning one of said parts lengthwise of the support, means movable toward and away from the support with said positioning means for positioning one end of said part widthwise of the support, means movable toward the support with both of said first-named positioning means for engaging the opposite end of said part and positioning it widthwise of the support, and means for moving said last-named positioning means away from the support prior to the movement of the two first-named positioning means away from said support.

5. A machine for use in assembling shoe bottom parts having, in combination, a support for the parts to be assembled, means for positioning the parts relatively to each other lengthwise of the support, said means acting also to position one end of one of said parts widthwise of the support, and means separate from said positioning means for positioning the other end of said part widthwise of the support.

6. A machine for assembling a plurality of shoe parts to form a shoe bottom unit having, in combination, a support for the shoe parts, means for applying pressure to said parts to mold them into an integral shoe bottom unit, means movable toward and away from the support for positioning one end portion of one of said parts widthwise of the other part, and means movable toward the support with said movable means for determining the widthwise position of the other end portion of said one part relatively to said other part.

7. A machine for use in assembling shoe bottom parts having, in combination, a support for said parts, means for locating one of said parts lengthwise and widthwise of the support, means for locating another of said parts lengthwise of the first-named part, and means separate from said last-named means for engaging the opposite ends of said other part and positioning them widthwise of said first-named part.

8. A machine for use in assembling shoe bottom parts having, in combination, a support for said parts, means for locating one of said parts lengthwise and widthwise of the support, means movable toward and away from the support for locating another of said parts lengthwise of the first-named part, means separate from said movable means but movable therewith for locating one end of said other part widthwise of the first-named part, and means movable toward the support with the two first-named movable means for locating the other end of said other part widthwise of the first-named part, said last-named means being movable away from the support independently of the said two first-named movable means.

9. A machine for use in assembling shoe bottom parts having, in combination, a support for said parts, means for locating one of said parts lengthwise and widthwise of the support, means movable toward and away from the support for locating another one of said parts lengthwise of the first-named part, means movable with said last-named means for locating one end of said other part widthwise of the first-named part, and means movable toward and away from the support for locating the opposite end of said other part widthwise of the first-named part, said last-named means being movable toward the support with said two first-named movable means but being movable away from the support independently of the movement of said two first-named movable means away from said support.

10. A machine for use in assembling shoe bottom parts, comprising an insole and a shank stiffener, having, in combination, a support for said parts, means for positioning an insole and shank stiffener relatively to each other lengthwise of the support, means for positioning the forward end of said shank stiffener widthwise of the insole, and means movable toward and away from the support for positioning the rear end of said shank stiffener widthwise of the insole.

11. A machine for use in assembling shoe bottom parts having, in combination, a support for said parts, means on the support for positioning one of said parts lengthwise of the support, means movable toward and away from the support for positioning another of said parts lengthwise of the first-named part, means movable toward and away from the support with said last-named means for positioning one end of said other part widthwise of the first-named part, and means separate from the two movable positioning means but movable toward the support therewith for positioning the other end of said other part widthwise of the support.

12. A machine for use in assembling shoe bottom parts having, in combination, a support for said parts, means carried by the support for positioning one of said parts lengthwise of the support, means movable toward and away from the support for positioning another of said parts lengthwise of the support, means movable toward and away from the support with said last-named means for positioning one end of said other part widthwise of the support, means separate from the two last-named positioning means for positioning the opposite end of said other part widthwise of the support, said separate means being movable toward the support with the two movable positioning means but being movable away from the support independently of said two movable positioning means, and means for moving said separate positioning means away from the support.

13. A machine for use in assembling shoe bottom parts having, in combination, a support for holding said parts in superimposed relation to each other, means carried by the support for positioning the lower shoe bottom part lengthwise of the support, means movable toward and away from the support for positioning an upper shoe bottom part lengthwise of the support, means movable toward and away from the support with said last-named means for positioning one end of said upper part widthwise of the support, and means additional to the two last-named positioning means for positioning the opposite end of said upper part widthwise of the support, said additional means being movable toward the support with the said two last-named positioning means but being movable away from the support independently of and prior to the movement of the said two last-named positioning means away from said support.

14. A machine for use in assembling shoe bottom parts having, in combination, a support for said parts, means for positioning the parts lengthwise of said support, means movable toward and away from the support for positioning said parts widthwise of the support, a member for pressing the parts against the support to hold them in position thereon, said pressing member also being movable toward and away from the support, and means actuated by movement of said member toward the support for moving the last-named positioning means away from said support.

15. A machine for use in assembling shoe bottom parts having, in combination, a support for said parts, means movable toward and away from the support for positioning the rear end of one of said parts widthwise of the support, a member movable toward and away from said support for pressing the parts against the support after the rear end of said one part has been positioned thereon, thereby maintaining the parts in position on said support, and means for moving said pressing member toward and away from the support, said last-named means being constructed and arranged to cause the positioning means to move away from the support when the pressing member moves into operative relation with said parts.

16. A machine for use in assembling shoe bottom parts having, in combination, a support for said parts, means movable toward and away from operative position relatively to the support for positioning one of said parts widthwise of the support, a member movable toward and away from operative position for pressing the parts against the support to hold them in position thereon after said one part has been positioned widthwise of said support, means acting to move the positioning means and said pressing member simultaneously toward the support to bring said positioning means into operative position, said last-named means moving the pressing member only part way into operative position by such action, and means actuated automatically by movement of the pressing member fully into operative position for moving the positioning means away from said operative position.

17. A machine for use in assembling shoe bottom parts having, in combination, a support for said parts, means movable into and out of operative position for positioning one of said parts on the support, a member movable into and out of operative position for pressing the parts against the support to hold them against movement thereon after they have been positioned, manually-operated means for moving said pressing member and said positioning means simultaneously toward the support to bring the positioning means into operative position relatively to the support, said manually-operated means moving the pressing member only part way into operative position by such action, and means actuated automatically by further movement of said manually-operated means in moving the pressing member fully into operative position for causing the positioning means to move out of operative position.

18. A machine for use in assembling shoe bottom parts having, in combination, a support for said parts, positioning means movable toward and away from said support for locating one end of one of said parts on the support, positioning means movable toward and away from said support for locating the other end of said part on the support, a member associated with the first-named positioning means for pressing the parts against the support to hold them in position thereon after said part has been thus located, treadle-operated means for moving said member and said first-named positioning means simultaneously toward the support to bring said first-named positioning means into operative position relatively to said part, connections between said first-named positioning means and the second positioning means for moving the latter into operative position simultaneously with the first-named positioning means, movement of said second positioning means into operative position also moving the pressing member part way toward the support, and means actuated by movement of said pressing member fully into operative position by further movement of said treadle-operated means for breaking said connections and causing said second positioning means to move out of operative position.

19. A machine for use in assembling shoe bottom parts having, in combination, a support for said parts, positioning means movable toward and away from said support for locating one end of one of said parts widthwise of the support, second positioning means movable toward and away from said support for locating the other end of said one part widthwise of the support, a member associated with the first-named positioning means for pressing the parts against the support to hold them in position thereon after said one part has been located widthwise, means for moving the pressing member and said first-named positioning means toward the support to bring said positioning means into operative relation to said one part, a latch between said first-named positioning means and the second positioning means for causing the latter to move into operative position simultaneously with the movement of said first-named positioning means into operative position, movement of said second positioning means toward operative position also moving the pressing member part way into operative position, means actuated by movement of said pressing member fully into operative position for automatically disconnecting said latch and thereby permitting the second positioning means to be moved out of said operative position while the first-named positioning means and the pressing member remain in their operative positions, and means for moving said second positioning means out of operative position when said latch is disconnected.

20. A machine for use in assembling shoe bottom parts having, in combination, a support for said parts, means movable toward and away from said support for positioning one end of one of said parts on the support, means movable toward and away from the support for positioning the other end of said part on the support, a member movable toward and away from the support for engaging said parts and holding them in position on the support after said one part has been positioned thereon, a manually-operated means for moving the first-named positioning means and said pressing member toward the support to bring said first-named positioning means into operative position, said movement of the manually-operated means moving said pressing member only part way into its operative position, a latch connecting said first-named positioning means to the second positioning means and arranged to cause the latter to be moved into operative position simultaneously with said first-named positioning means upon operation of said manually-operated means, means carried by said pressing member for automatically disconnecting said latch from said second positioning means upon movement of the pressing member fully into operative position by said manually-operated means, and spring means for returning the second positioning means into its inoperative position when said latch is released.

ERNEST F. STACEY.

References Cited in the file of this patent
UNITED STATES PATENTS

| Number | Name | Date |
|---|---|---|
| 554,652 | Campbell | Feb. 18, 1896 |
| 1,176,916 | Lund | Mar. 28, 1916 |
| 1,415,838 | Griffiths et al. | May 9, 1922 |
| 2,040,122 | Card, Jr. | May 12, 1936 |
| 2,083,583 | Whelton | June 15, 1937 |
| 2,185,941 | Dunn | Jan. 2, 1940 |
| 2,207,887 | Johnston | July 16, 1940 |